US009001133B2

(12) United States Patent
Kim et al.

(10) Patent No.: US 9,001,133 B2
(45) Date of Patent: Apr. 7, 2015

(54) EDID SHADOWING TECHNIQUES FOR FAST DISPLAY STARTUP

(75) Inventors: Taesung Kim, Los Altos, CA (US); Paolo Sacchetto, Cupertino, CA (US); Prasanna Nambi, Cupertino, CA (US)

(73) Assignee: Apple Inc., Cupertino, CA (US)

(*) Notice: Subject to any disclaimer, the term of this patent is extended or adjusted under 35 U.S.C. 154(b) by 386 days.

(21) Appl. No.: 13/480,116

(22) Filed: May 24, 2012

(65) Prior Publication Data

US 2013/0314423 A1 Nov. 28, 2013

(51) Int. Cl.

| | |
|---|---|
| ***G06T 15/00*** | (2011.01) |
| ***G06T 1/00*** | (2006.01) |
| ***G06F 3/038*** | (2013.01) |
| ***G09G 5/00*** | (2006.01) |
| ***G09G 5/18*** | (2006.01) |

(52) U.S. Cl.

CPC ............ *G09G 5/18* (2013.01); *G09G 2330/026* (2013.01); *G09G 2370/047* (2013.01); *G09G 2370/22* (2013.01)

(58) Field of Classification Search

CPC ............ G09G 5/006; G09G 2370/047; G09G 2370/12; G09G 2370/042; G09G 2370/04

See application file for complete search history.

(56) References Cited

U.S. PATENT DOCUMENTS

| | | | | |
|---|---|---|---|---|
| H2186 | H | 4/2007 | Noorbakhsh et al. | |
| 7,705,842 | B2 | 4/2010 | Panabaker et al. | |
| 7,911,473 | B2 | 3/2011 | Noorbakhsh et al. | |
| 7,911,475 | B2 | 3/2011 | Noorbakhsh et al. | |
| 2005/0232030 | A1 * | 10/2005 | Mawatari et al. | 365/189.05 |
| 2010/0073384 | A1 | 3/2010 | Kim et al. | |

FOREIGN PATENT DOCUMENTS

| | | | |
|---|---|---|---|
| KR | 10-2008-0001209 * | 1/2008 | G09G 3/36 |

* cited by examiner

*Primary Examiner* — Kee M Tung
*Assistant Examiner* — Nicholas R Wilson
(74) *Attorney, Agent, or Firm* — Fletcher Yoder PC

(57) ABSTRACT

Techniques are provided for improving electronic display startup time using extended display identification data (EDID) shadowing. In one example, a method for starting an electronic display may include accessing, by a timing controller, EDID from a memory device. The method may also include storing EDID from the memory device in the timing controller. The method may include, after storing EDID from the memory device, transmitting a signal from the timing controller to a host device to indicate that the host device can access the stored EDID. The method may also include accessing, by the timing controller, configuration data from the memory device. The method may include, after transmitting the signal to the host device, transferring the EDID stored in the timing controller to the host device while the timing controller is accessing the configuration data resulting in reduced startup time of the electronic display.

22 Claims, 7 Drawing Sheets

EDID SHADOWING TECHNIQUES FOR FAST DISPLAY STARTUP

BACKGROUND

The present disclosure relates generally to electronic displays, and more particularly, to extended display identification data (EDID) shadowing techniques for fast display startup.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs) and organic light-emitting diode (OLED) displays, are commonly used in electronic devices such as televisions, computers, and phones. Some electronic displays portray images by modulating the amount of light that passes through a liquid crystal layer within pixels of varying color. For example, by varying a voltage difference between a pixel electrode and a common electrode in a pixel, an electric field may result. The electric field may cause the liquid crystal layer to vary its alignment, which may ultimately result in more or less light being emitted through the pixel where it may be seen. By changing the voltage difference (often referred to as a data signal) supplied to each pixel, images may be produced on the display.

When an electronic display is turned on, the electronic display is first initialized to process image data from a host device. Specifically, the electronic display retrieves extended display identification data (EDID) and timing controller configuration data from a storage device as part of the initialization. Conventionally, after the electronic display has completed the initialization process, the electronic display sends a signal to the host device notifying the host device that the electronic display is initialized and can begin receiving image data. Such an initialization process may be time consuming and may delay the startup time of the electronic display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for applying extended display identification data (EDID) shadowing techniques to speed up display startup. By way of example, a method for starting an electronic display of an electronic device may include accessing, by a timing controller of the electronic display, EDID from a memory device in the electronic display. The method may also include storing EDID from the memory device in the timing controller. In addition, the method may include, after storing EDID from the memory device, transmitting a signal from the timing controller to a host device to indicate that the host device can access the stored EDID. The method may also include, accessing, by the timing controller, configuration data from the memory device. Furthermore, the method may include, after transmitting the signal to the host device, transferring the EDID stored in the timing controller to the host device while the timing controller is accessing the configuration data.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to electronic displays (e.g., LCDs, OLED displays) and electronic devices incorporating electronic displays that employ a fast startup device, method, or combination thereof. Specifically, rather than delaying initialization of a host device until after a timing controller of the electronic display is completely initialized, which could increase startup time, embodiments of the present disclosure may incorporate hardware, software, or a combination thereof for initializing the host device after the timing controller is partially initialized and while the timing controller completes its initialization.

Specifically, to decrease the startup time of an electronic display of an electronic device, extended display identification data (EDID) from a memory device in the electronic display may be accessed by a timing controller of the electronic display. The EDID may be stored in the timing controller. The timing controller may transmit a signal (e.g., hot plug detect (HPD)) to a host device to notify the host device that it can retrieve EDID. The host device may access the EDID while the timing controller accesses configuration data to complete initialization of the timing controller. As a result, the startup time of the electronic display may be reduced.

Figure 1:
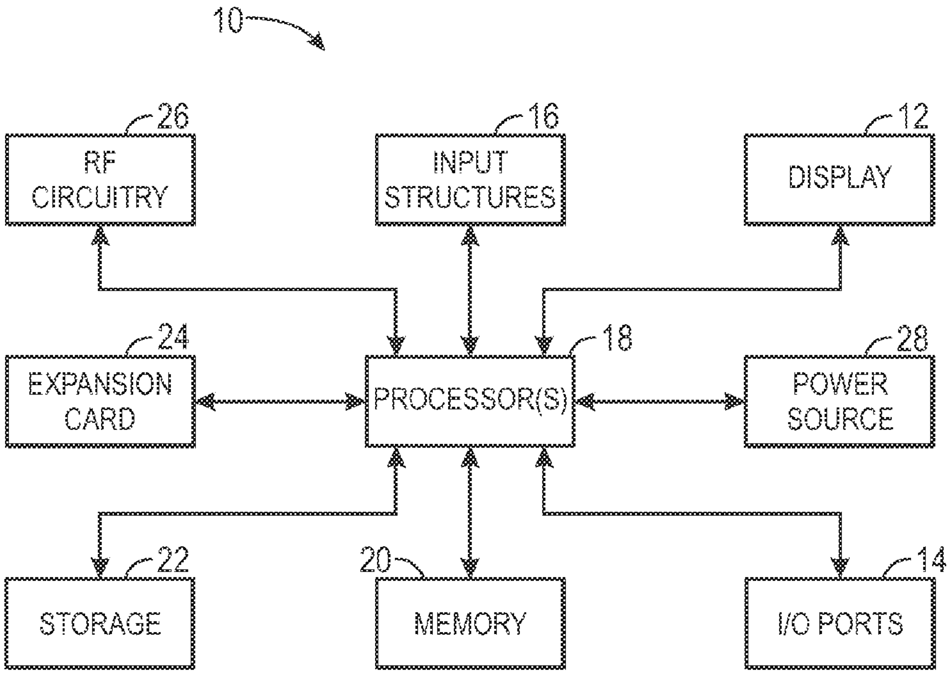
FIG. 1 is a block diagram of an electronic device that may employ extended display identification data (EDID) shadowing techniques for fast display startup, in accordance with aspects of the present disclosure.
Figure 2:
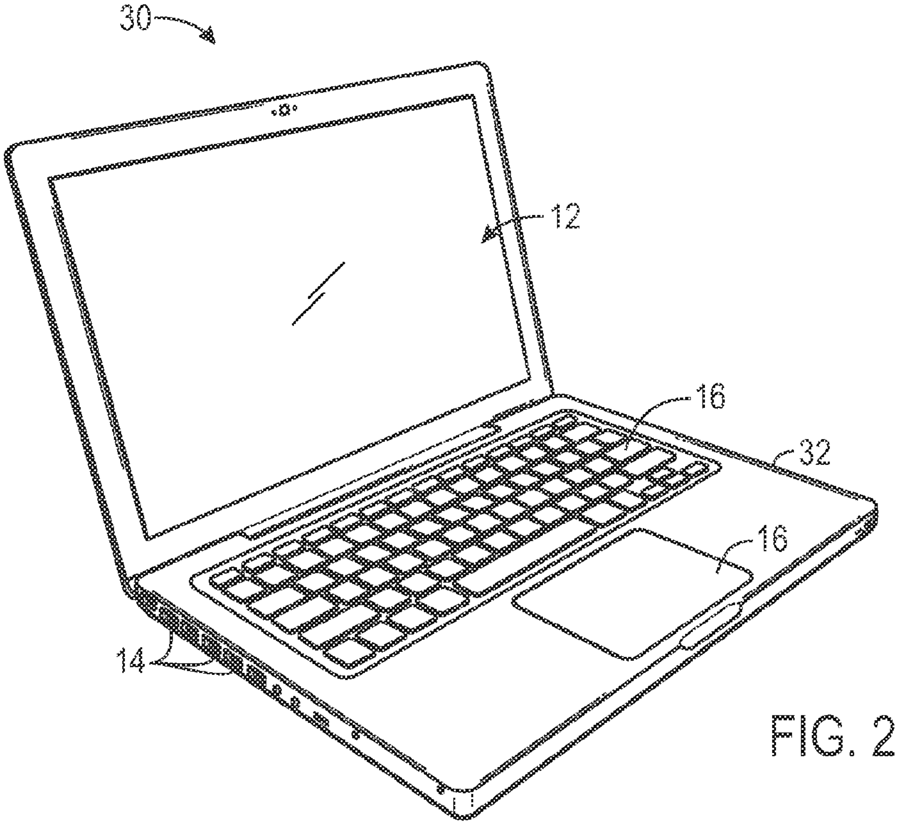
FIG. 2 is a perspective view of a notebook computer representing an embodiment of the electronic device of FIG. 1, in accordance with an embodiment.
Figure 3:
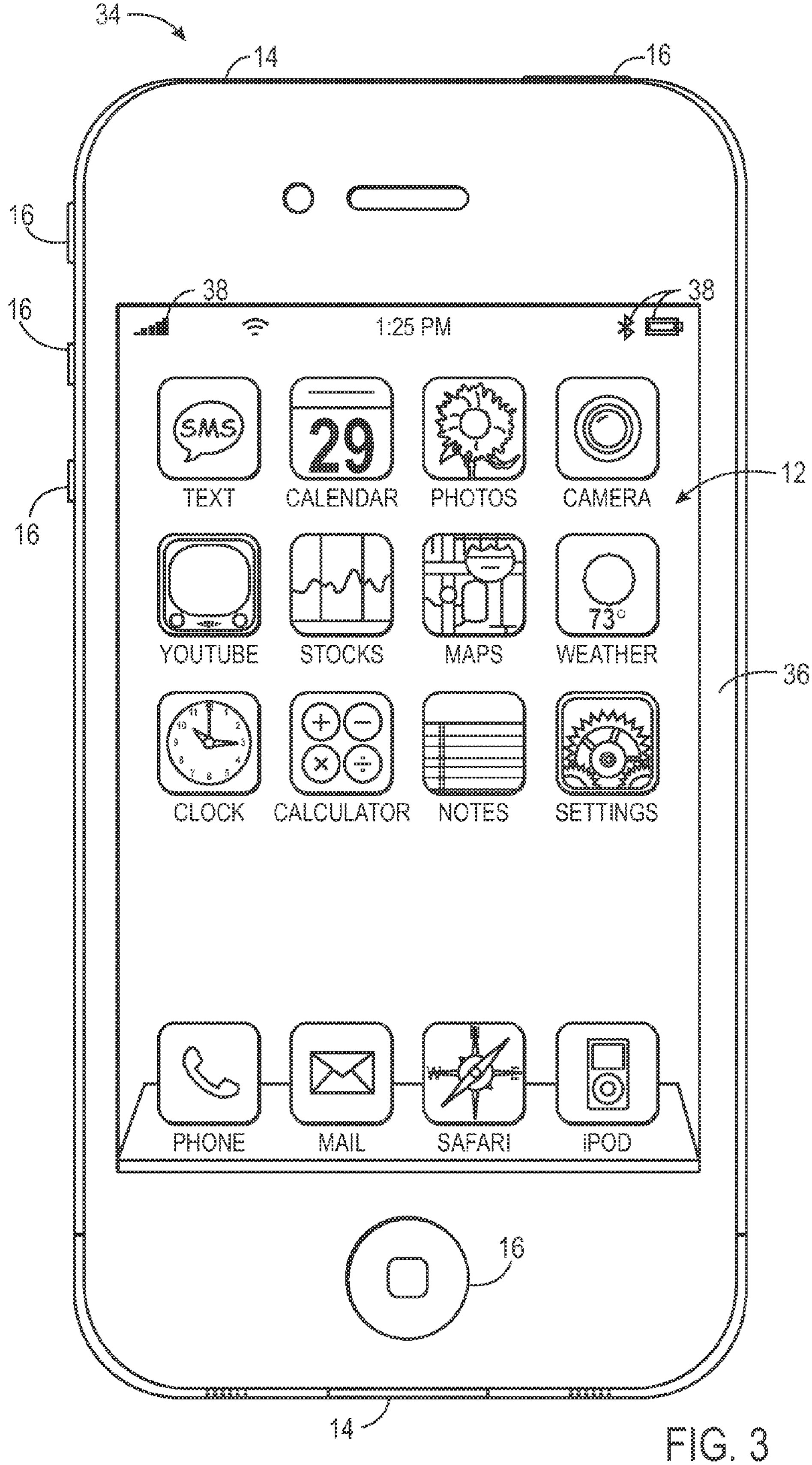
FIG. 3 is a front view of a handheld device representing another embodiment of the electronic device of FIG. 1, in accordance with an embodiment.
Figure 4:
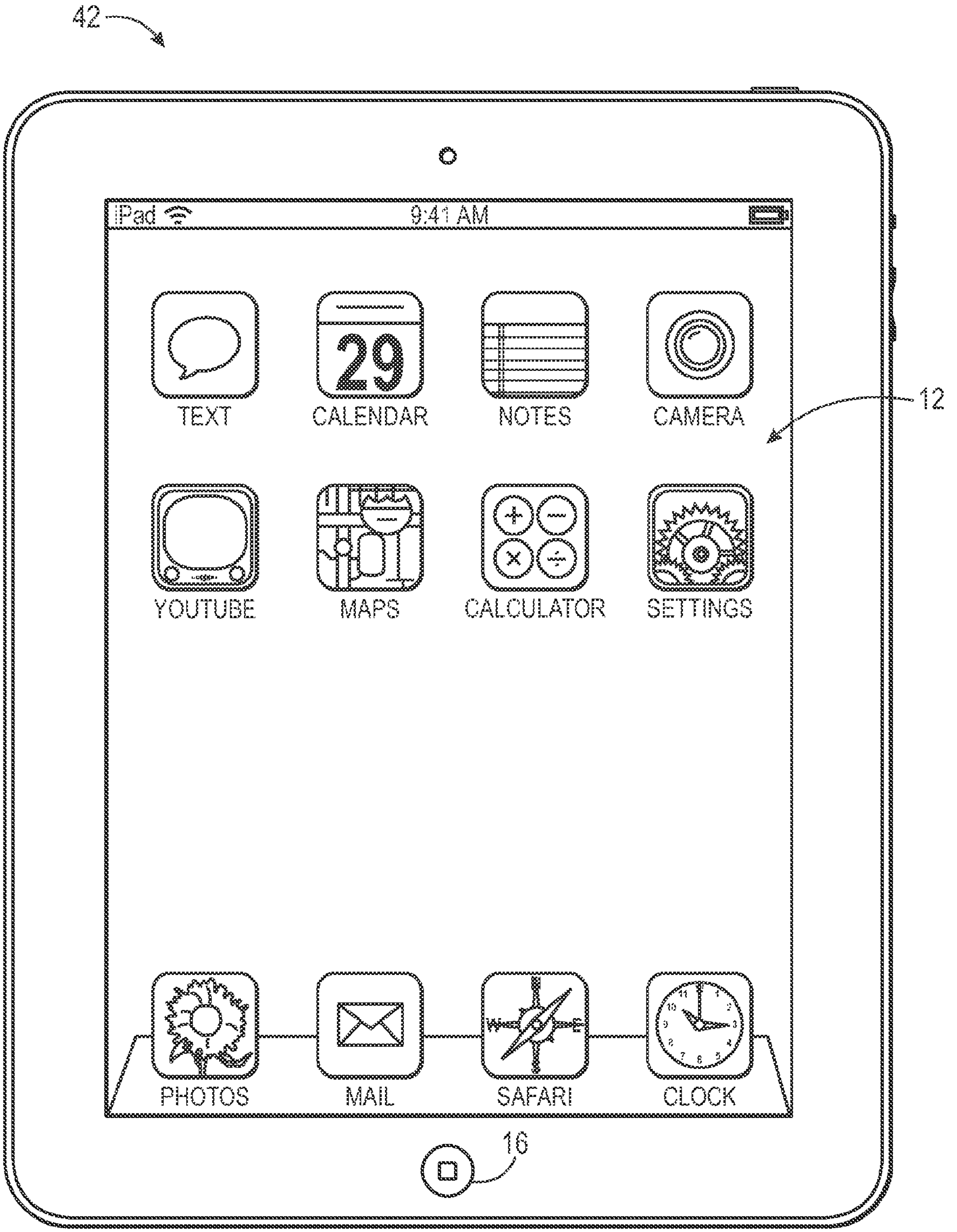
FIG. 4 is a front view of a tablet device representing a further embodiment of the electronic device of FIG. 1, in accordance with an embodiment.

With the foregoing in mind, a general description of suitable electronic devices that may employ electronic displays having capabilities to reduce startup time is described below. In particular, FIG. 1 is a block diagram depicting various components that may be present in an electronic device suitable for use with such a display. FIGS. 2, 3, and 4 respectively illustrate perspective and front views of suitable electronic devices, which may be, as illustrated, a notebook computer, a handheld electronic device, or a tablet computing device.

Turning first to FIG. 1, an electronic device 10 according to an embodiment of the present disclosure may include, among other things, a display 12, input/output (I/O) ports 14, input structures 16, one or more processor(s) 18, memory 20, nonvolatile storage 22, an expansion card 24, RF circuitry 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As will be appreciated, embodiments of the present disclosure may be employed to decrease the startup time of the display 12 of the electronic device 10.

By way of example, the electronic device 10 may represent a block diagram of the notebook computer depicted in FIG. 2, the handheld device depicted in FIG. 3, the tablet computing device depicted in FIG. 4, or similar devices. It should be noted that the processor(s) 18 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 18 and/or other data processing circuitry may be operably coupled with the memory 20 and the nonvolatile storage 22 to execute instructions. Such programs or instructions executed by the processor(s) 18 may be stored in any suitable article of manufacture that includes one or more tangible, computer-readable media at least collectively storing the instructions or routines, such as the memory 20 and the nonvolatile storage 22. The memory 20 and the nonvolatile storage 22 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 18.

The display 12 may be a touch-screen liquid crystal display (LCD), for example, which may enable users to interact with a user interface of the electronic device 10. In some embodiments, the electronic display 12 may be a MultiTouch™ display that can detect multiple touches at once.

The input structures 16 of the electronic device 10 may enable a user to interact with the electronic device 10 (e.g., pressing a button to increase or decrease a volume level). The I/O ports 14 may enable electronic device 10 to interface with various other electronic devices, as may the expansion card 24 and/or the RF circuitry 26. The expansion card 24 and/or the RF circuitry 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 12, I/O ports 14, and input structures 16. In one embodiment, the input structures 16 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on the display 12. Furthermore, the display 12 may be configured to reduce startup time of the display 12 as explained in detail below.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 34 may include an enclosure 36 to protect interior components from physical damage and to shield them from electromagnetic interference. The enclosure 36 may surround the display 12, which may display indicator icons 38. The indicator icons 38 may indicate, among other things, a cellular signal strength, Bluetooth connection, and/or battery life. The I/O ports 14 may open through the enclosure 36 and may include, for example, a proprietary I/O port from Apple Inc. to connect to external devices.

User input structures 16, in combination with the display 12, may allow a user to control the handheld device 34. For example, the input structures 16 may activate or deactivate the handheld device 34, navigate a user interface to a home screen, navigate a user interface to a user-configurable application screen, activate a voice-recognition feature of the handheld device 34, provide volume control, and toggle between vibrate and ring modes. The electronic device 10 may also be a tablet device 42, as illustrated in FIG. 4. For example, the electronic device 10 may be a model of an iPad® available from Apple Inc. As mentioned above, the display 12 may be configured to reduce the startup time of the electronic device 10.

Figure 5:
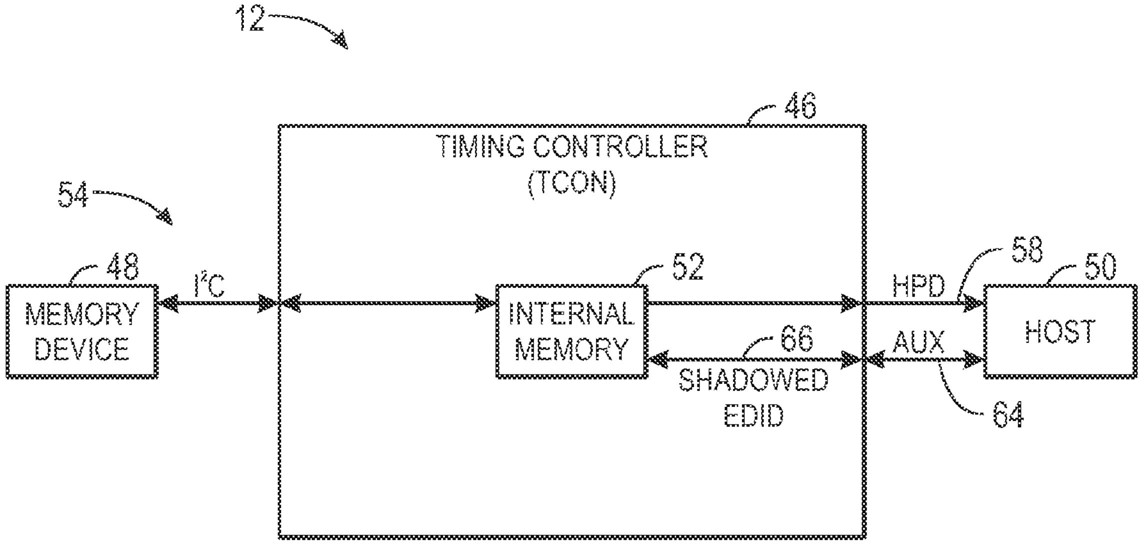
FIG. 5 is a block diagram illustrating data transfer for initializing a timing controller of an electronic display, in accordance with an embodiment.

During startup of the display 12, the display 12 is at least partially initialized before receiving image data from the processor 18. Accordingly, FIG. 5 is a block diagram illustrating data transfer for initializing a timing controller (TCON) 46 of the electronic display 12. The TCON 46 is initialized using data (e.g., extended display identification data (EDID), TCON setup data, and look up table (LUT) setup data) received from a memory device 48 (e.g., a non-volatile memory device such as EEPROM) before it processes data received from a host device 50 (e.g., a processor 18). As will be appreciated, the EDID is a data structure that is based on a Video Electronics Standards Association (VESA) standard. Furthermore, the TCON 46 provides the data received from the memory device 48 to the host device 50 to initialize the host device 50.

The TCON 46 accesses data from the memory device 48 and stores the data in an internal memory device 52 (e.g., a volatile memory device such as internal registers). Specifically, the TCON 46 may access EDID and configuration data (e.g., TCON setup data, LUT setup data). In the present embodiment, the TCON 46 communicates with the memory device 48 using an inter-integrated circuit ($I^2C$) interface 54, although the TCON 46 may communicate with the memory device 52 using any suitable interface.

In the present embodiment, operation of the display 12 may occur by the TCON 46 accessing data from the memory device 52 using the $I^2C$ interface 54. After the TCON 46 has accessed the EDID and stored the EDID in the internal memory device 52, the TCON 46 sends the hot plug detect (HPD) signal 58 to the host device 50 to notify the host device 50 that the TCON 46 has stored the EDID in the internal memory device 52. The host device 50 then accesses shadowed EDID from the internal memory device 52 using the auxiliary interface 64 and a communication line 66. Accordingly, the TCON 46 may continue initialization while the host device 50 accesses the shadowed EDID from the internal memory device 52, thereby reducing startup time of the display 12.

Figure 6:
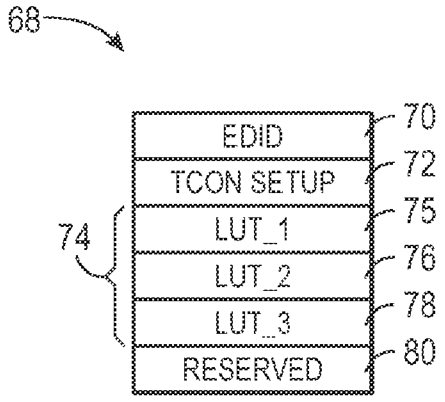
FIG. 6 is a table illustrating data that may be stored on a memory device accessed by a timing controller, in accordance with an embodiment.

The memory device 48 may include different types of initialization data for the TCON 46. FIG. 6 is a table illustrating different types of initialization data that may be stored on the memory device 48. As such, the memory device 48 may include EDID 70 and configuration data (e.g., TCON setup data 72, LUT setup data 74). The LUT setup data 74 may be divided into segments including LUT_1 75, LUT_2 76, and LUT_3 78 (e.g., data for color processing, temperature compensating, temperature correction, etc.). The memory device 48 may also include a reserved memory section 80 that may be used to store any additional data that may be accessed by the TCON 46.

Figure 7:
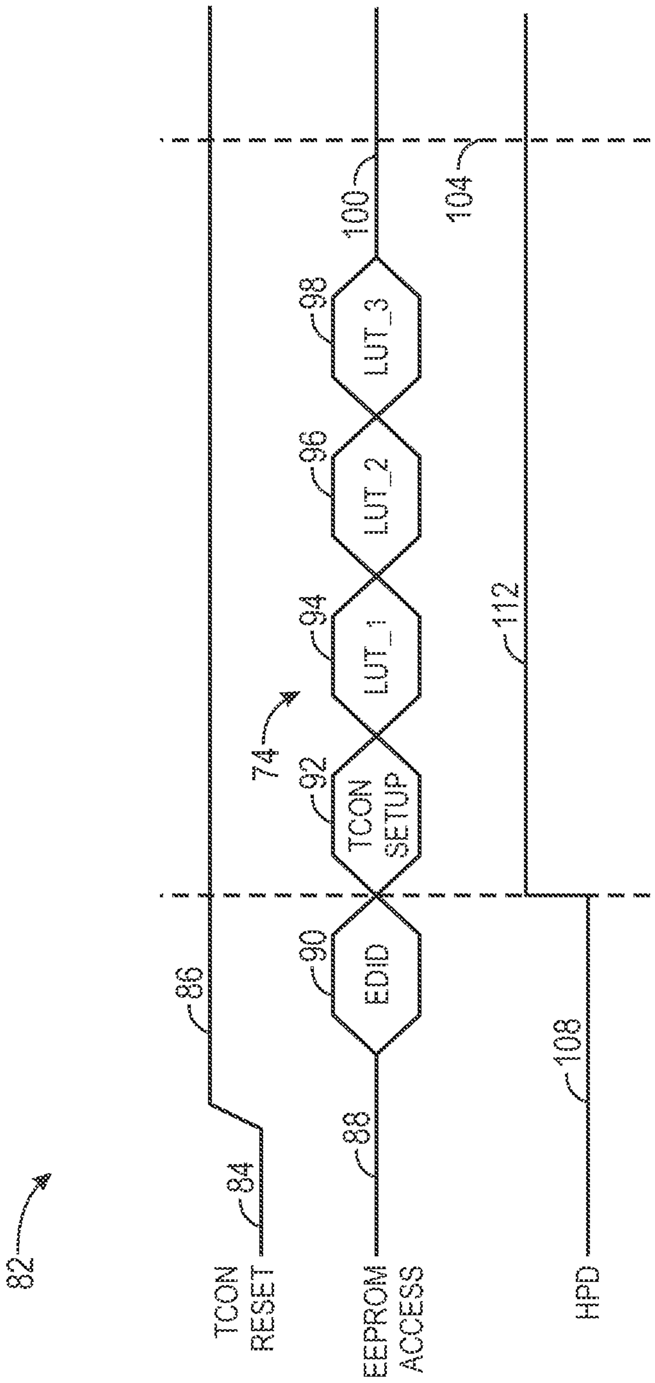
FIG. 7 is a timing diagram illustrating an electronic display fast startup sequence, in accordance with an embodiment.

As described above, the TCON 46 may be initialized by accessing data from the memory device 48. FIG. 7 illustrates a timing diagram 82 of an electronic display 12 with a fast startup sequence. As illustrated, the TCON reset signal is applied to the TCON 46 in a deactivated state during segment 84. Then, the TCON reset signal transitions to the activated state where it remains during segment 86. In the activated state, the TCON reset signal causes the TCON 46 to begin initialization.

In the present embodiment, an EEPROM access signal shows that the TCON 46 does not access initialization data (e.g., EDID 70 and configuration data) during segment 88. Then, during segment 90, the TCON 46 accesses EDID 70 and during segment 92, the TCON 46 accesses TCON setup data 72. Thereafter, the TCON 46 accesses LUT data 74. For example, the TCON 46 accesses LUT_1 data 75 during segment 94, LUT_2 data 76 during segment 96, and LUT_3 data 78 during segment 98. During segment 100, initialization of the TCON 46 is complete and the TCON 46 does not access initialization data. For example, initialization of the TCON 46 may be complete at a time 104.

As discussed previously, the TCON 46 may be configured to store EDID 70, to send the HPD signal to the host device 50 before the TCON 46 is completely initialized, and to allow the host device 50 to access the EDID 70 stored in the TCON 46 while the TCON 46 completes its initialization. Specifically, an HPD signal is applied from the TCON 46 to the host device 50 in a deactivated state during segment 108. Then, at time 110, the HPD signal transitions to the activated state where it remains within segment 112. After the HPD signal transitions to the activated state, the host device 50 begins its initialization at the same time that the TCON 46 completes its initialization. As illustrated, time 110 is a time after the TCON 46 has finished accessing EDID 70 (e.g., segment 90). As will be appreciated, using the present embodiment the display 12 startup time may be reduced by the difference between time 104 and time 110. In certain embodiments, the difference between time 104 and time 110 may be up to approximately 100 ms. In other embodiments, the difference between time 104 and time 110 may be less than or greater than approximately 100 ms.

Figure 8:
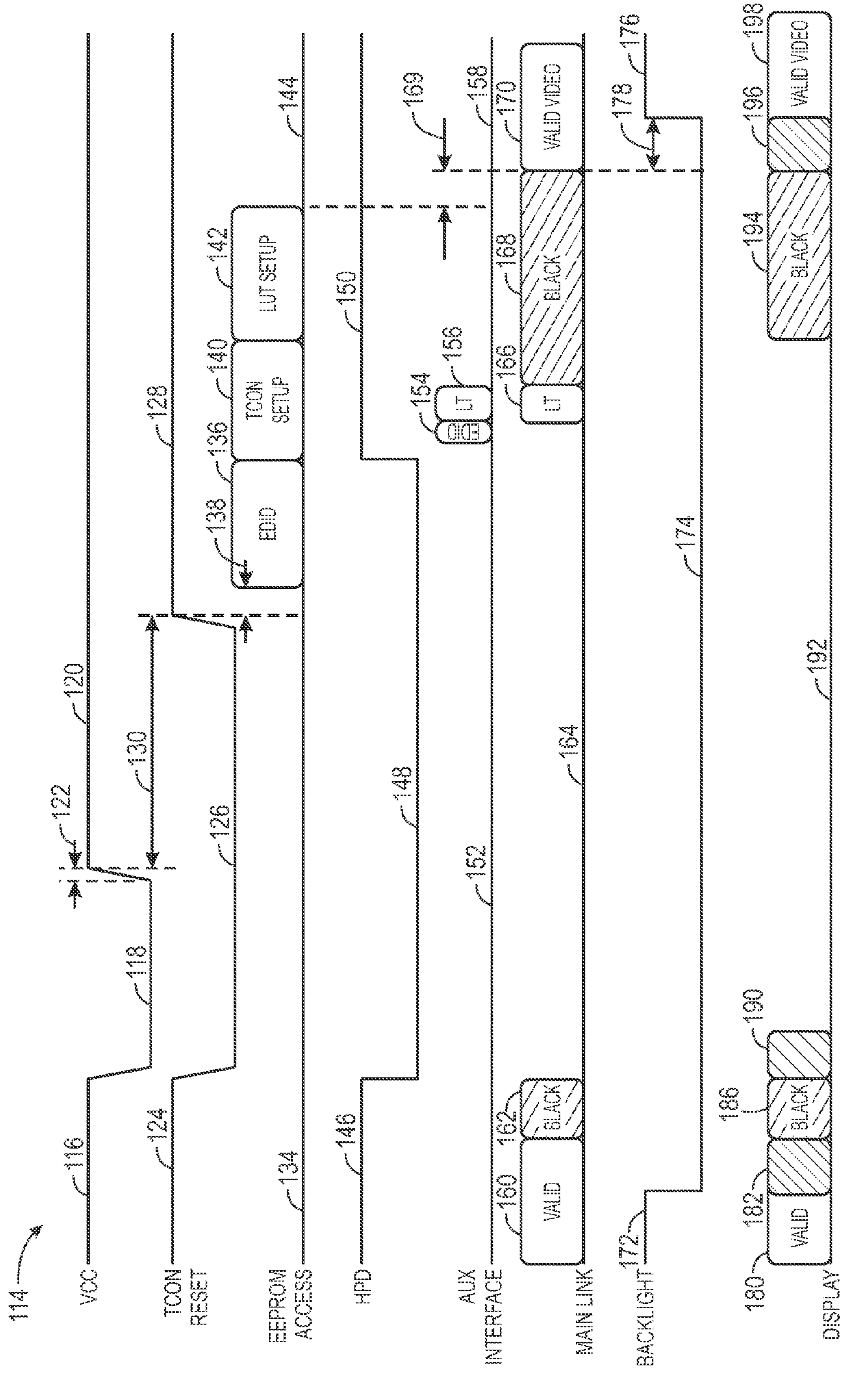
FIG. 8 is a timing diagram illustrating a detailed fast startup sequence of an electronic display, in accordance with an embodiment.

A detailed timing diagram 114 illustrating a fast startup sequence of the electronic display 12 is illustrated in FIG. 8. In the present embodiment, a VCC signal (e.g., 3.3 V) is illustrated in an activated state during segment 116. With the VCC signal in the activated state, the display 12 is powered. Then, during segment 118 the VCC signal is in a deactivated state so that the display 12 is not powered. Power is again applied to the display 12 by activating the VCC signal during segment 120. For purposes of the present embodiment, the display 12 is considered to begin startup when the VCC signal begins to transition from a deactivated state to an activated state. The transition time of the VCC signal is signified by a VCC rise time duration 122, which may represent the time it takes for the power supply to rise from 10% to 90% of VCC. In certain embodiments, the VCC rise time duration 122 may be approximately 0.1 to 2.0 ms.

The TCON reset signal is illustrated in an activated state during segment 124. Then, during segment 126 the TCON reset signal is in a deactivated state. The TCON reset signal transitions to the activated state during segment 128 where it remains for the rest of the timing diagram 114. After transitioning from the deactivated state to the activated state, the TCON 46 begins initialization. As illustrated, there may be a delay between when the VCC signal is activated and when the TCON reset signal is activated. This delay is signified by a TCON reset delay duration 130 and may be caused by a fixed delay generation circuit of the display 12. In certain embodiments, the TCON reset delay duration 130 may be approximately 8 to 25 ms.

The EEPROM access signal illustrates that the TCON 46 does not access initialization data during segment 134. Then, during segment 136, the TCON 46 accesses the EDID 70. The time between the start of segment 128 and the start of accessing the EDID 70 is represented by an EEPROM access delay 138. In certain embodiments, the EEPROM access delay 138 may be approximately 2 to 5 ms. Furthermore, the time that it takes to access the EDID 70 may be an EDID access duration of approximately 15 ms (e.g., time for segment 136). During segment 140, the TCON 46 accesses TCON setup data 72 and thereafter during segment 142 the TCON 46 accesses LUT data 74. The time that it takes to access the TCON setup data 72 may be a TCON setup duration of approximately 25 ms, while the time it takes to access the LUT data 74 may be an LUT setup duration of approximately 75 ms.

The HPD signal is applied from the TCON 46 to the host device 50 in an activated state during segment 146. Then, during segment 148, the HPD signal is applied in a deactivated state. The HDP signal transitions back to the activated state where it remains within segment 150. After the HPD signal transitions to the activated state, the host device 50 begins its initialization at the same time that the TCON 46 completes its initialization. As illustrated by segment 150, the HPD signal is activated at approximately the end of segment 136 where the EDID 70 is accessed by the TCON 46 (e.g., the TCON 46 has finished accessing EDID 70). As will be appreciated, according to the present embodiment, by activating the HPD signal near the intersection of segments 136 and 140, the display 12 startup time may be reduced by approximately 100 ms (e.g., the TCON setup duration of 25 ms plus the LUT setup duration of 75 ms), as compared to a system where the HPD signal is activated after segment 142.

An AUX interface signal illustrates when data is transferred via the AUX interface 64. During segment 152, no data is transferred via the AUX interface 64. Thereafter, during segment 154, the EDID 70 is transferred from the TCON 46 to the host device 50 via the AUX interface 64. As illustrated, segment 154 occurs at a time after the HPD signal is activated (e.g., the start of segment 150). During segment 156, the AUX interface signal is used to transfer link training (LT) data to train a receiver in the TCON 46. Thereafter, during segment 158, no data is transferred via the AUX interface 64.

A main link signal illustrates when data is transferred to the display 12 via the main link. During a segment 160, valid video data is transferred to the display 12. Then, during a segment 162, black video data is transferred to the display 12. As illustrated, during a segment 164, no data is transferred to the display 12. During segment 166, LT data is transferred to the display 12 at approximately the same time as the LT data transfer of segment 156. Thereafter, during segment 168 black video data is transferred to the display 12. In the present embodiment, the black video data is transferred to the display 12 until one full black frame has been transferred after the segment 142 (e.g., where the EEPROM access signal accesses LUT setup data 74). As will be appreciated, the time for one full black frame may be represented by a black frame duration 169. In certain embodiments, the black frame duration 169 may be approximately 17 ms. After segment 168, valid video data is transferred by the main link during segment 170.

A backlight signal illustrates when a backlight of the display 12 is activated. Specifically, during segment 172 the backlight is activated. The backlight is deactivated during segment 174. Then, during segment 176, the backlight is again activated. After the backlight is activated, the startup of the display 12 is complete. As illustrated, during a portion of segment 174 the backlight is not activated, but valid video data is being transferred via the main link. In the present embodiment, the backlight is not activated until one full valid video frame has been transferred. The time for one full valid video frame to be transferred may be represented by a video frame duration 178. In certain embodiments, the video frame duration 178 may be approximately 17 ms.

A display signal illustrates when data is being shown by the display 12. For example, during segment 180 valid video data is displayed. During segment 182, valid video data is present, but the backlight is not illuminated. Thereafter, black frame data is displayed during segment 186. Segment 190 illustrates a time where pixel data is discharged. During segment 192, data is not shown on the display 12. Then, during segment 194, black frame data is displayed. Again, during segment 196, valid video data is present, but the backlight is not illuminated. During segment 198 (after the backlight is activated), valid video data is displayed.

The total startup time of the display 12 may be the time that it takes from power being applied to the display 12 until the display 12 is showing valid data. For example, the total startup time of the display 12 may be a sum of the following durations: the VCC rise time duration 122 (e.g., 2 ms), the TCON reset delay duration 130 (e.g., 25 ms), the EEPROM access delay 138 (e.g., 5 ms), the EDID access duration (e.g., 15 ms), the TCON setup duration (e.g., 25 ms), the LUT setup duration (e.g., 75 ms), the black frame duration 169 (e.g., 17 ms), and the video frame duration 178 (e.g., 17 ms). In certain embodiments, the total startup time of the display 12 may be approximately 181 ms. As discussed above, by sending the HPD signal after EDID 70 has been accessed by the TCON 46, but before the TCON 46 is completely (e.g., fully) initialized, the total startup time of the display 12 may be reduced by approximately 100 ms. For example, using conventional methods the total startup time of the display may be approximately 281 ms, however, while using presently disclosed embodiments the total startup time of the display 12 may be approximately 181 ms.

Figure 9:
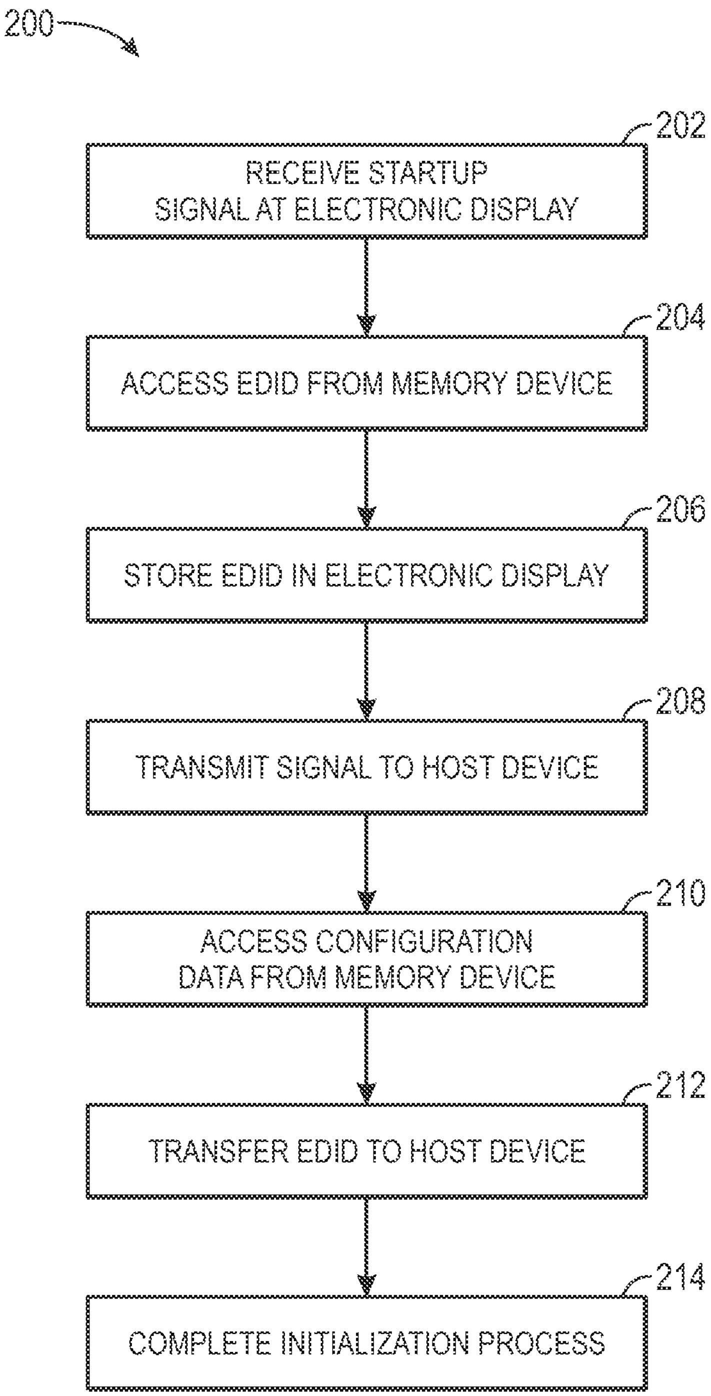
FIG. 9 is a flow chart of a method for decreasing startup time of an electronic display, in accordance with an embodiment.

As discussed herein, the total startup time of the display 12 may be significantly reduced. Accordingly, FIG. 9 illustrates a flow chart of a method 200 for decreasing startup time of the electronic display 12. A startup signal (e.g., TCON reset) is received by the electronic display 12 (e.g., the TCON 46 of the electronic display 12) to indicate to the electronic display 12 to begin accessing the EDID 70 (block 202). The electronic display 12 then accesses the EDID 70 from the memory device 48 (e.g., EEPROM) of the electronic display 12 (block 204). The EDID 70 is stored in a memory (e.g., volatile memory) of the electronic display 12 (e.g., the internal memory 52 of the TCON 46) (block 206).

After the EDID 70 from the memory device 48 is stored, a signal (e.g., HPD) is transmitted from the electronic display 12 (e.g., via the TCON 46) to the processor 18 (e.g., the host device 50) signifying that the electronic display 12 has completed a portion of an initialization process (e.g., of the TCON 46) (block 208). The electronic display 12 then accesses configuration data (e.g., the TCON setup data 72, the LUT setup data 74) from the memory device 48 of the electronic display 12 (block 210). After transmitting the signal (e.g., HPD) to the processor 18, the EDID 70 stored in the memory of the electronic display 12 is transferred to the processor 18 while the electronic display 12 is accessing the configuration data (block 212). The electronic display 12 completes the initialization process after it is done accessing the configuration data (block 214).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for starting an electronic display of an electronic device comprising:

accessing, by a timing controller of the electronic display, extended display identification data (EDID) from a memory device in the electronic display;

storing the EDID from the memory device in the timing controller;

after storing the EDID from the memory device, transmitting a signal from the timing controller to a host device to indicate that the host device can access the stored EDID;

accessing, by the timing controller, configuration data from the memory device; and after transmitting the signal to the host device, transferring the EDID stored in the timing controller to the host device while the timing controller is accessing the configuration data.

2. The method of claim 1, comprising completing an initialization process of the timing controller, wherein transmitting the signal from the timing controller to the host device is indicative of the timing controller completing a portion of the initialization process.

3. The method of claim 1, wherein accessing EDID from the memory device comprises accessing EDID from an EEPROM external to the timing controller.

4. The method of claim 1, wherein accessing configuration data from the memory device comprises accessing timing controller setup data, lookup table setup data, or any combination thereof.

5. The method of claim 1, wherein storing the EDID in the timing controller comprises storing the EDID in an internal register of the timing controller.

6. The method of claim 1, wherein transmitting the signal from the timing controller to the host device comprises transmitting a hot plug detect (HPD) signal from the timing controller to the host device.

7. The method of claim 1, comprising receiving video data before the timing controller is fully initialized.

8. The method of claim 1, comprising activating a backlight of the electronic display after the timing controller has completed accessing configuration data from the memory device.

9. The method of claim 1, comprising receiving a startup signal at the timing controller prior to accessing EDID, wherein the startup signal indicates to the timing controller to begin accessing EDID.

10. An electronic device comprising:

a processor configured to send image data to an electronic display; and an electronic display configured to receive image data sent from the processor, to access extended display identification data (EDID) and configuration data from a memory device in the electronic display, and to transfer the EDID to the processor while the electronic display is accessing the configuration data.

11. The electronic device of claim 10, wherein the electronic device comprises a timing controller configured to access EDID and configuration data from the memory device in the electronic display and to transfer the EDID to the processor while the electronic display is accessing the configuration data.

12. The electronic device of claim 10, wherein the electronic display is configured to transmit a signal to the processor indicating that the electronic display is available to transfer the EDID to the processor.

13. The electronic device of claim 10, wherein the electronic display is configured to store the EDID and the configuration data.

14. An electronic display comprising:

a memory device configured to store extended display identification data (EDID);

a timing controller configured to:

access EDID from the memory device;

store EDID from the memory device;

after storing EDID from the memory device, transmit a signal to a host device to indicate that the host device can access the stored EDID;

access configuration data from the memory device; and after transmitting the signal to the host device, transfer the stored EDID to the host device while accessing the configuration data from the memory device.

15. The electronic display of claim 14, wherein the memory device comprises a non-volatile memory device.

16. The electronic display of claim 14, wherein the timing controller comprises at least one internal register configured to store EDID.

17. An electronic display configured to access extended display identification data (EDID) and configuration data from a memory device and to transfer the EDID to a processor while the electronic display is accessing the configuration data to decrease startup time of the electronic display.

18. The electronic display of claim 17, wherein the electronic display is configured to decrease startup time of the electronic display by an amount of time taken by the electronic display to access configuration data.

19. The electronic display of claim 17, wherein the electronic display is configured to store the EDID.

20. A method for starting an electronic display of an electronic device comprising:

receiving a startup signal at the electronic display indicating to the electronic display to begin accessing extended display identification data (EDID);

accessing, by the electronic display, EDID from a non-volatile memory device of the electronic display;

storing EDID from the memory device in a volatile memory device of the electronic display;

after storing EDID from the non-volatile memory device, transmitting a signal from the electronic display to a processor to indicate that the processor can access the stored EDID;

accessing, by the electronic display, configuration data from the non-volatile memory device; and after transmitting the signal to the processor, transferring the EDID stored in volatile memory device of the electronic display to the processor while the electronic device is accessing the configuration data.

21. The method of claim 20, wherein transmitting the signal from the electronic display to the processor comprises transmitting a hot plug detect (HPD) signal from the electronic display to the processor.

22. The method of claim 20, comprising receiving image data from the processor after transferring the EDID stored in the electronic display to the processor.

* * * * *